Aug. 27, 1963   H. HORLACHER   3,101,738
COMBINED SEQUENCE AND CHECK VALVE
Filed April 17, 1961
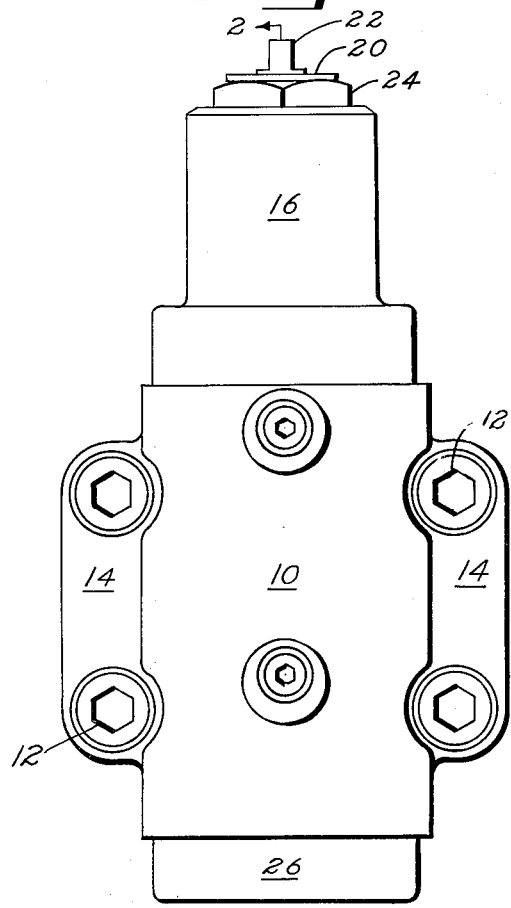
*Fig.1*
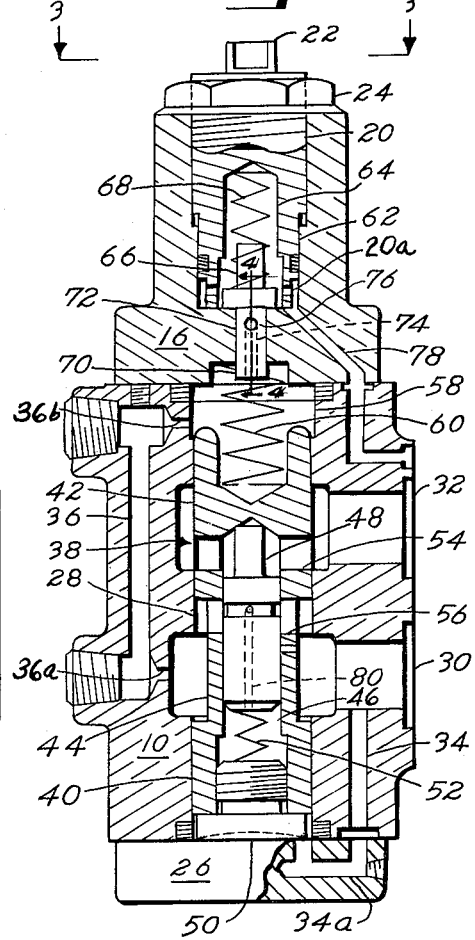
*Fig.2*
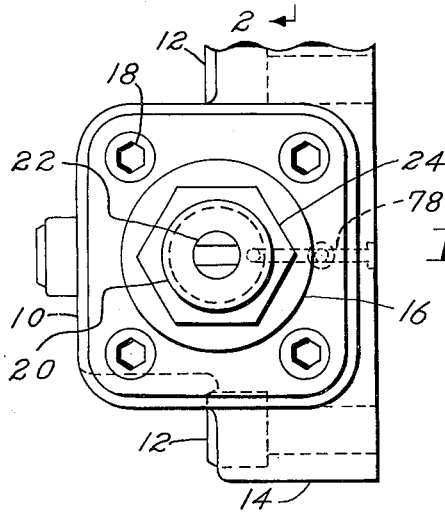
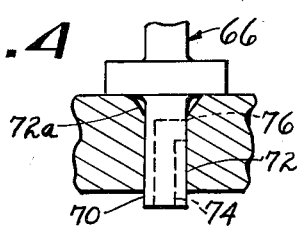
*Fig.4*
*Fig.3*
INVENTOR.
HERMAN HORLACHER
BY
Howard Keiser
& John F. Verhoeven
ATTORNEYS

United States Patent Office 3,101,738
Patented Aug. 27, 1963

3,101,738
COMBINED SEQUENCE AND CHECK VALVE
Herman Horlacher, Cincinnati, Ohio, assignor to The Cincinnati Milling Machine Co., Cincinnati, Ohio, a corporation of Ohio
Filed Apr. 17, 1961, Ser. No. 103,641
2 Claims. (Cl. 137—489)

This invention relates to a sequence and check valve for a fluid power transmission circuit.

In many applications of fluid powered motors, sequence and check valves are required for operation of the motors in accordance with a predetermined power requirement schedule. In many sequence valves, the pressure required to just crack the valve open is less than the pressure required to fully open the valve for maximum flow. If rapid response of the motor is required at the instant that the fluid supplied to the motor reaches a preset level, such a valve is unsatisfactory. In many cases, the same fluid circuit and motor may be required to perform in a variety of ways, for example, to produce a range of output forces and speeds. Therefore the sequence valve must be adjustable through a wide range of operating pressures. Often sequence valves must be operated from a remote circuit which produces a pressurized fluid signal. Therefore convenient adaptability to remote signal operating is important and the remote signal should be capable of immediately shifting the valve to the fully open condition upon reaching an operating pressure level.

It is therefore an object of this invention to provide a sequence and check valve in which there is no substantial pressure differential between the just cracked condition and the fully opened condition.

It is another object of this invention to provide a sequence and check valve which is adjustable to respond to a wide range of operating pressures.

It is a further object of this invention to provide a sequence valve which is readily adaptable to respond to a remote and relatively low pressure control signal whereby the valve is immediately shifted to the fully open position.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A sequence and check valve constructed in accordance with the preferred form of this invention utilizes a two stage valve in which a pilot operated control plunger regulates sequence of fluid flow. Fluid under pressure is applied to each end of the control plunger to create balanced opposing forces. At a predetermined level of fluid pressure in the pressure inlet, the pilot stage opens to prevent the pressure at one end of the control plunger from rising beyond a preset value. Pressure continues to rise at the other end of the control plunger as the inlet pressure rises above the level at which the pilot stage is operated. The forces acting on the control plunger become unbalanced in a direction to shift that plunger to an open position against a spring applied bias force of small magnitude which will hold the valve closed while the forces on the plunger are balanced.

The valve is also adaptable for operation by a remote pressure control signal. Inlet pressure is connected to one end of the control plunger and a remote pressure signal is applied to the other end to open the valve at the proper time. The remote pressure signal must be greater than the predetermined inlet pressure at which the pilot valve is set to operate by an amount sufficient to create a force on the end of the control plunger to which it is applied just greater than the force produced at the other end by the predetermined inlet pressure and bias spring. When such a remote pressure signal in applied to the control plunger, the valve shifts immediately to the fully open position.

The construction and operation of the sequence and check valve of the invention are described in the following detailed description and the attached drawings in which:

FIG. 1 is an elevational view of the valve.

FIG. 2 is a sectional view of FIG. 1 on line 2—2.

FIG. 3 is a top elevation of the valve as viewed from line 3—3 of FIG. 2.

FIG. 4 is an enlarged partial section of FIG. 2 on line 4—4.

In the preferred form, the valve is made up of a body 10 (FIGS. 1, 3) which may be attached to a mounting surface by means of bolts 12 which extend through laterally projecting lug portions 14 of the valve body. A pilot valve block 16 is fixed by machine screws 18 to the upper end of the valve body 10. An adjusting screw 20 with an adjusting stem 22 extends from the top of the pilot valve block 16. The adjusting screw is locked in position by a nut 24 threadedly engaged around the top of the screw 20. A cap 26 is fixed to the lower end of the body 10 to close that portion of the valve.

Inside the valve body 10 (FIG. 2) is a bore 28. A pair of primary fluid passages 30, 32 extend through the body 10 and terminate in the bore 28. The passage 30 is joined by a control passage 34 which is connected with a passage 34a in the cap 26. The passage 34a terminates in the lower end of the bore 28. A second control passage 36 connects with the primary fluid passage 30 through control restrictions 36a, 36b and extends through the body 10 to the upper portion of the bore 28 in which it terminates. A control plunger 38 is slidably received in the bore 28 and has two full diameter lands 40, 42 joined by a reduced diameter portion 44. The plunger 38 has a bore 46 in which a check plunger 48 is slidably received. The check plunger 48 is retained in the control plunger 38 by a plug 50. A check bias spring 52 is received between the plug 50 and the check plunger 48 to hold that plunger against the end of the plunger bore 46 opposite the plug 50. A fluid port 54 extends through the upper land portion 42 and puts the control plunger bore 46 in communication with the primary passage 32. A second port 56 extends through the reduced diameter portion 44 and places the control plunger bore 46 in communication with the primary passage 30. The check plunger 48 in the checked position normally closes the passage defined by the ports 54, 56 and the control plunger bore 46.

The pilot valve block 16 closes the end of the body bore 28 and with the top of the control plunger 38 defines a control chamber 58 in the top of that bore to which the primary passage 30 is connected by control passage 36. A spring 60 is received between the pilot valve block 16 and the control plunger 38 which tends to hold the plunger 38 away from the pilot valve block 16. A pilot valve bore 62 extends into the pilot valve block 16. A portion of the pilot valve bore 62 is threaded to receive the adjusting screw 20. The screw 20 has a counter bored portion 64 in which a relief plunger 66 is received. A relief spring 68 tends to hold the relief plunger 66 at the bottom of the pilot bore 62. The relief plunger 66 has a reduced diameter portion 70 which extends through a communicating bore 72 into the control chamber 58. A relief fluid passage 74 extends into the reduced diameter portion 70 and ends at a port 76 in the side of the reduced diameter portion 70. A drain line 78 communicates with the pilot bore 62 and the counter bore 64 in the screw 20.

In operation fluid under a varying pressure is applied to the valve through the primary passage 30 which is then an inlet passage. The pressure in passage 30 is transmitted through control passages 34, 34a to the valve body bore 28 at the lower end of the control plunger 38. Simultaneously the pressure in the passage 30 is transmitted through control passage 36 to the chamber 58 at the upper end of the control plunger 38. The effective transverse area at each end of the plunger 38 on which the fluid pressure acts is the same and the forces created by the fluid pressure in passage 30 are balanced and have no effect on the plunger 38. The spring 60, which may be light to produce only a small force, then holds the plunger 38 against the cap 26 at the lower end of the bore 28. In this position, the land 42 isolates the inlet fluid passage 30 from the primary passage 32 which is the outlet path for the fluid under pressure supplied to the bore 28 through the primary passage 30.

The fluid pressure transmitted to the chamber 58 produces a force on the lower end of the reduced diameter portion 70 of the relief plunger 66 which opposes the force on the relief plunger 66 produced by the relief spring 68. The setting of the screw 20 determines the amount of force created by the relief spring 68 and will hold the relief plunger down in a closed position until the force is overcome by the force resulting from the fluid pressure in the chamber 58. The screw 20 is shown in the highest operating pressure position in which the bottom of the bore 62 is engaged by the bottom of the screw 20 and ports 20a therein communicate between the bore 62 and the bore 64. As the pressure in inlet passage 30 increases, the pressure in the chamber 58 increases.

At the moment that pressure in the chamber 58 has increased to the level at which the relief plunger 66 begins to shift, the port 76 connects the chamber 58 with the drain passage 78. A small amount of fluid begins to flow through the passage 36 to the drain line 78. The amount is very small and gradually becomes greater in a smoothly increasing fashion due to the gradual opening provided by the round port 76 as it moves into the area of the bore 72 where the top edge is provided with a break 72a (FIG. 4). This gradual opening of the port 76 to drain prevents a chatter movement of the plunger 66 which might result from a drop in pressure in the chamber 58 (FIG. 2) if that chamber should suddenly be connected to drain the line 78. The drop in pressure in chamber 58 would be a result of fluid flow through the control restriction 36a to the control passage 36 and from the restriction 36b into chamber 58 which is downstream. The restrictions 36a and 36b provide a pressure drop due to the resistance to fluid flow created therein. With a drop in pressure in the chamber 58, the relief spring 68 would force the relief plunger 66 back to isolate the drain line 78 from the chamber 58. The pressure in the chamber 58 would then rise again to force a reopening of the relief passage 74 to the drain line. Thus a chatter tendency would develop. The gradual opening of the port 76 prevents this and the relief plunger 66 is smoothly shifted to a condition whereby a constant pressure will be maintained in the chamber 58, this pressure being slightly less than the pressure in the inlet passage 30 due to a small flow through the control restriction 36a. The pressure in the chamber 58 in this condition has reached an upper limit beyond which it will not go. Further increase in pressure at the inlet 30 causes an unbalance of forces between the ends of the control plunger 38, the force on the plug 50 in the lower end of the plunger 38 becoming greater. The force on the plug 50 opposes the force created by the bias spring 60. The spring 60 is a weak spring and requires little force to overcome. Therefore the plunger 38 is shifted immediately against the bias of spring 60 when the inlet pressure rises above the pressure at which the chamber 58 is limited by operation of the relief plunger 66 by a small amount sufficient to overcome the bias spring 60. When the plunger 30 begins to shift, it shifts immediately to the fully opened condition.

The bulk of the fluid flows from the passage 30 to the passage 32 since the amount bled off through the pilot valve is small due to the resistance to flow created in the control restrictions 36a and 36b. The control plunger 38 will remain in the upper or open position until the pressure in line 30 is reduced below the level at which the resulting pressure in chamber 58 forces the relief plunger 66 to shift against the relief spring 68. When the pressure is reduced below that level, the control plunger 38 shifts back to the lower or blocked position.

The valve also provides for relatively free reverse flow, that is, fluid under pressure is supplied to the bore 28 from the primary passage 32. The pressure of that fluid is felt on the top of the check plunger 48 in the bore 46 of the control plunger 38 since the port 54 provides an opening between the passage 32 and the bore 46. The pressure in line 32 creates a force on the check plunger 48 which opposes the force produced by the check spring 52 and the check plunger 48 shifts downward in the bore 46 to an open position from the checked position and the port 54 is connected to the port 56 in the control plunger bore 46. Port 56 opens to the primary passage 30 and the fluid flows in a reverse manner from the passage 32, through the ports 54 and 56 and the bore 46 to the passage 30. The check spring 52 need not be very strong and little pressure in line 32 is required to shift the check plunger 48 to its open position. The chamber in which the check spring 52 is located is in communication with the passage 30 through the passage 80 which allows any fluid trapped therein to be exhausted to the low pressure line when the check plunger 48 is shifted.

The control plunger 38 may be shifted from the blocked position to the open position during sequence operation in response to a remote signal. For adaptation to remote operation the fluid passage 34 in the body would be blocked. A remote pressure control line would then be connected to the cap 26 to communicate with the control passage 34a. Should the pressure in the inlet passage 30 increase to the level at which the relief plunger 66 shifts to the open position, the force on the control plunger 38 produced by fluid pressure in chamber 58 would be limited, but the control plunger 38 would not immediately shift since the forces on that plunger remain unbalanced in a direction tending to hold it in the blocked position until pressure is applied to the fluid passage 34a. When a remote pressure signal is applied to the control passage 34a, a force is produced on the lower end of the control plunger 38. This force opposes the force tending to hold the control plunger in the blocked position and when it overcomes the combined force on the plunger 38 produced by the pressure in chamber 58 and the spring 60, the plunger 38 is then shifted to the fully open position to connect the inlet passage 30 with the outlet passage 32. Thus the remote pressure signal determines the sequence operation of the valve. A remote pressure signal of sufficient magnitude to overcome the force in the chamber 58 produced by fluid pressure in passage 36 and the spring 60 may be used to shift the plunger 38 to the open position regardless of the position of the relief plunger 72. It is also possible to limit the force produced by the inlet pressure on the upper end of the control plunger 38 by adjustment of the screw 20 so that a remote pressure signal less than the inlet pressure will cause the valve to open and connect passages 30 and 32. Thus a higer pressure flow may be controlled by a lower pressure signal.

What is claimed is:

1. A sequence and check valve comprising in combination, a valve body having a bore therein and a pair of primary fluid passages for supplying fluid under varying pressure to said valve body bore and for removing fluid under pressure therefrom, a control plunger received in said valve body bore and slidable between a blocked position and an open position for alternately isolating said primary passages from one another and connecting said primary passages to one another respectively in said valve body bore, said control plunger having a bore therein and a pair of spaced fluid ports to connect said control plunger bore to said pair of primary fluid passages respectively, means to produce a bias force tending to hold said control plunger in the blocked position, means defining a pair of control fluid passages in said body operable to connect said valve body bore at each end of said control plunger to one of said primary fluid passages tending to produce balanced opposing hydraulic forces thereon, means to hold the hydraulic force at one end of said plunger substantially at a predetermined fluid pressure level to effect an unbalance of said opposing hydraulic forces, said hydraulic forces when unbalanced overcoming said bias force and shifting said control plunger to the open position, a check plunger received in said control plunger bore and slidable therein between a checked position and an open position, said fluid ports isolated from one another when said check plunger is in said checked position and connected to one another in said control plunger bore when said check plunger is in said open position thereof, and means to produce a bias force on said check plunger tending to hold said check plunger in said checked position, said bias force yieldable when the fluid pressure in said one primary fluid passage is less than the fluid pressure in the other of said primary passages by a predetermined amount whereby said check plunger is shifted to the open position thereof.

2. A sequence and check valve comprising in combination, a valve body having a bore therein and a pair of primary fluid passages for supplying fluid under varying pressure to said valve body bore and for removing fluid under pressure therefrom, a control plunger received in said valve body bore and slidable between a blocked position and an open position for alternately isolating said primary passages from one another and connecting said primary passages to one another respectively in said valve body bore, said control plunger having a bore therein and a pair of spaced fluid ports to connect said control plunger bore to said pair of primary fluid passages respectively, a pilot valve block on said body at one end of said valve body bore and defining, with one end of said control plunger, a control chamber therebetween in said valve body bore, said pilot valve block having a pilot bore and a drain passage therein, a sequence spring received in said chamber for producing a force on said control plunger tending to enlarge said chamber by moving said control plunger to the blocked position, a pair of control fluid passages in said body in communication with one of said primary passages, one of said control passages communicating with said chamber and having a flow restriction therein, and the other of said control passages communicating with said valve body bore at the other end of said control plunger, a relief plunger in said pilot bore having one end in communication with said chamber, said plunger movable in said pilot bore between a closed position and an open position to connect said chamber to said drain passage through said pilot bore, a relief spring in said pilot bore operable to produce a force tending to hold said relief plunger in said closed position, means to adjust said relief spring to yield when the pressure in said control chamber reaches a predetermined magnitude whereby said relief plunger is shifted to the open position thereof and an unbalance of opposed hydraulic forces on the control plunger is produced, said opposed forces, when unbalanced, overcoming said sequence spring force and shifting said control plunger to said open position thereof, a check plunger received in said control plunger bore and slidable therein between a checked position and an open position, said fluid ports isolated from one another when said check plunger is in said checked position and connected to one another in said control plunger bore when said check plunger is in said open position thereof, and a check spring in said control plunger bore operable to produce a bias force on said check plunger tending to hold said check plunger in the checked position, said check spring yieldable when the fluid pressure in said one primary fluid passage is less than the fluid pressure in the other of said primary passages by a predetermined amount whereby said check plunger is shifted to the open position thereof.

References Cited in the file of this patent
UNITED STATES PATENTS

| | | |
|---|---|---|
| 2,410,375 | Wright | Oct. 29, 1946 |
| 2,661,017 | Geiger | Dec. 1, 1953 |
| 2,853,096 | Lee | Sept. 23, 1958 |
| 2,923,306 | Mitchell | Feb. 2, 1960 |
| 2,930,398 | Barrett et al. | Mar. 29, 1960 |
| 2,979,077 | Swenson | Apr. 11, 1961 |